United States Patent
Kitakado et al.

(10) Patent No.: US 6,501,569 B1
(45) Date of Patent: *Dec. 31, 2002

(54) IMAGE TRANSMISSION APPARATUS

(75) Inventors: Jun Kitakado, Gifu (JP); Masamichi Kawakami, Gifu (JP); Tetsuji Sawai, Aichi (JP)

(73) Assignee: Sanyo Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/722,600

(22) Filed: Sep. 27, 1996

(30) Foreign Application Priority Data

Sep. 29, 1995 (JP) .............................. 7-253887
Mar. 29, 1996 (JP) ............................. 8-076830

(51) Int. Cl.⁷ ............................. H04N 1/32; H04N 1/00
(52) U.S. Cl. ...................... 358/468; 358/435; 358/437
(58) Field of Search ........................ 358/468, 401, 358/442, 404, 444, 400, 405, 438, 434, 435, 437

(56) References Cited

U.S. PATENT DOCUMENTS

| | | | | |
|---|---|---|---|---|
| 5,109,281 A | * | 4/1992 | Kobori et al. | 358/450 |
| 5,216,517 A | * | 6/1993 | Kinoshita | 358/400 |
| 5,384,836 A | * | 1/1995 | Otsuka | 379/100 |
| 5,488,488 A | * | 1/1996 | Shimizu | 358/468 |
| 5,555,104 A | * | 9/1996 | Todaka | 358/468 |
| 5,657,258 A | * | 8/1997 | Grewe | 364/708.1 |
| 5,835,081 A | * | 11/1998 | Oka | 345/173 |
| 5,870,721 A | * | 2/1999 | Norris | 705/38 |
| 5,892,824 A | * | 4/1999 | Beatson et al. | 380/25 |

FOREIGN PATENT DOCUMENTS

| | | |
|---|---|---|
| JP | 58-39161 | 3/1983 |
| JP | 59171257 A | 9/1984 |
| JP | 03030572 A | 2/1991 |
| JP | 05167832 A | 7/1993 |
| JP | 05284332 A | 10/1993 |
| JP | 06014182 A | 1/1994 |

* cited by examiner

Primary Examiner—Jerome Grant, II
(74) Attorney, Agent, or Firm—Armstrong, Westerman & Hattori, LLP

(57) ABSTRACT

An image transmission apparatus provided with a FAX modem, an encoding/decoding section, a digitizer-integrated LCD, encoded image data memory, original image data memory, and additional image data memory. Original image data received by the FAX modem are temporarily stored in the encoded image data memory, and the original image data are decoded by the encoding/decoding section. The thus-decoded original image is stored in the original image data memory. An image of the thus-stored original image data is displayed on the digitizer-integrated LCD. An operator draws an additional image on the digitizer-integrated LCD. Data representing the thus-drawn additional image are stored in the additional image data memory. The thus-stored additional image data are encoded by the encoding/decoding section, and the thus-encoded additional image data are temporarily stored in the encoded image data memory. Then, the encoded additional image data are sent by the FAX modem.

2 Claims, 7 Drawing Sheets

IMAGE TRANSMISSION APPARATUS

BACKGROUND OF THE INVENTION

1. Field of the Invention

The present invention relates to an image transmission apparatus and, more particularly, to an image transmission apparatus that transmits an image by facsimile transmission and sends additions or corrections related to the received image back to the sender.

2. Description of the Related Art

In a conventional facsimile transmission system, where a received image is sent back after additions or corrections have been made thereto, the received image is initially output on record paper by a facsimile. Additions or corrections are made on the record paper, and the thus-added or corrected image is read and sent back again by the facsimile.

If these procedures are repeated, the image quality is degraded each time the procedures are repeated, which renders the details of the image illegible.

To prevent this problem, Unexamined Japanese Patent Application No. Sho-58-39161 discloses a facsimile image transfer system. In this system, a sender sends an original image. A receiver superimposes additions on a received image using a synthesizer. The thus-superimposed image is sent back to the sender.

In the above-described conventional facsimile image transmission system, the image that is synthesized by superimposing the received image on the received image to which additions have been made is sent back. As a result, the amount of image data to be sent back becomes massive, which in turn results in increased communication time and cost.

SUMMARY OF THE INVENTION

The primary object of the present invention is to provide an image transmission apparatus capable of reducing communication time and cost by minimizing the data size of an image to be sent back as well as preventing picture quality degradation.

To this end, according to one aspect of the present invention, an image transmission apparatus for transmitting image data comprises:

receiving image data storage means for holding receiving image data;

display means for displaying an image of the image data stored in the receiving image data storage means;

input means for entering an additional image to the image displayed on the display means; and additional image data storage means for holding image data of the additional image entered by the input means.

In the above-described image transmission apparatus, the received image data storage means stores received image data. The thus-received image data are displayed. If an additional image is entered with respect to the displayed image, the data of the thus-entered additional image are stored in the additional image data storage means.

As a result, the history of additions is recorded, which makes it easy to manage images. When compared with the conventional transmission apparatus that holds the original image data and the original image data to which additions have been made, the transmission apparatus stores the received original image data and the additional image data. As a result, storage memory capacity of the transmission apparatus can be relatively reduced.

The image transmission apparatus should preferably be provided with transmission means for sending the additional image data stored in the additional image data storage means. With this arrangement, the received additional image data are superimposed on the image data by the receiver of the additional image data, and resultant composite image data are displayed at the receiving end. As a result, degradation in picture quality can be prevented. Only the additional image data are sent from the sender of the additional image data, and therefore it is possible to reduce communication time and cost.

The received image data storage means should preferably store the received image data together with an identification code for identifying the image data. Further, the additional image data storage means should preferably store the additional image data together with the identification code for identifying the image data. As a result, the image transmission apparatus that sends the image data is prevented from being occupied by the transmission.

According to another aspect of the present invention, an image transmission apparatus comprises:

receiving means for receiving image data; received image data storage means for holding the image data received by the receiving means;

display means for displaying an image of the image data stored in the received image data storage means;

input means for entering an additional image with respect to the image displayed on the display means;

additional image data storage means for holding the additional image data input by the input means; and sending means for sending the additional image data stored in the additional image data storage means.

In the above-described image transmission apparatus, the receiving means receives image data, and the thus-received image data are stored in the received image data storage means. The thus-stored image data are then displayed by the display means. An additional image is entered with respect to the displayed image by the input means, and the additional image data are stored in the additional image data storage means. The thus-stored additional image data are sent by the sending means.

The image data and the additional data should preferably be merged into one composite image by the sender of the image data, and the thus-created composite image should preferably be displayed at the sending end.

As a result, degradation in picture quality can be prevented. Only the additional image data are sent from the sender of the additional image data, and therefore it is possible to reduce communication time and cost.

Upon receipt of the image data, the receiving means should preferably disconnect the communication line between the sender of the image data and the receiver, which enables a reduction in communication time and cost.

Further, the image data should preferably be sent together with an identification code, which prevents the image transmission apparatus at the sending end from being occupied.

According to still another aspect of the present invention, an image transmission apparatus comprises a transceiver section for sending encoded data of an additional image as well as receiving encoded data of the original image;

an encoding/decoding section for coding data of the additional image as well as decoding the encoded data of the original image;

original image data memory for holding image data of the decoded original image;

a digitizer LCD for entering an additional image with respect to the displayed original image as well as displaying the original image of the image data stored in the original image data; and additional image data memory for holding data of the entered additional image.

In the above-described image transmission apparatus, the transceiver section receives encoded data of the original image. The thus-received encoded data are decoded by the encoding/decoding section, and image data of the thus-decoded original image are stored in the original image memory. An image of the thus-stored image data of the original image is displayed on the digitizer LCD, and an additional image is entered with respect to the thus-displayed original image. The entered original image is stored in the additional image data memory, and the original image is encoded by the encoding/decoding section. The thus-encoded original image is sent to the sender of the original image data through the transceiver section.

The additional image data is superimposed on the original image data, so that resultantly created composite image is displayed, and therefore degradation in picture quality can be prevented. Moreover, the image transmission apparatus at the receiving end sends only the additional image, which makes it possible to reduce communication time and cost.

According to a further aspect of the present invention, an image transmission apparatus comprises:

sending means for sending image data;

receiving means for receiving additional image data entered with respect to the image data; and display means for displaying a composite image by superimposing the additional image data on the image data.

In the above-described image transmission apparatus, the sending means sends image data first. The receiving means receives additional image data sent from a receiver, and the thus-received additional image data are superimposed on the image data by the display means. Resultantly created composite image appears on the display means.

Consequently, the image data can be displayed while the additional data is superimposed thereon.

DESCRIPTION OF THE PREFERRED EMBODIMENTS

Figure 1:
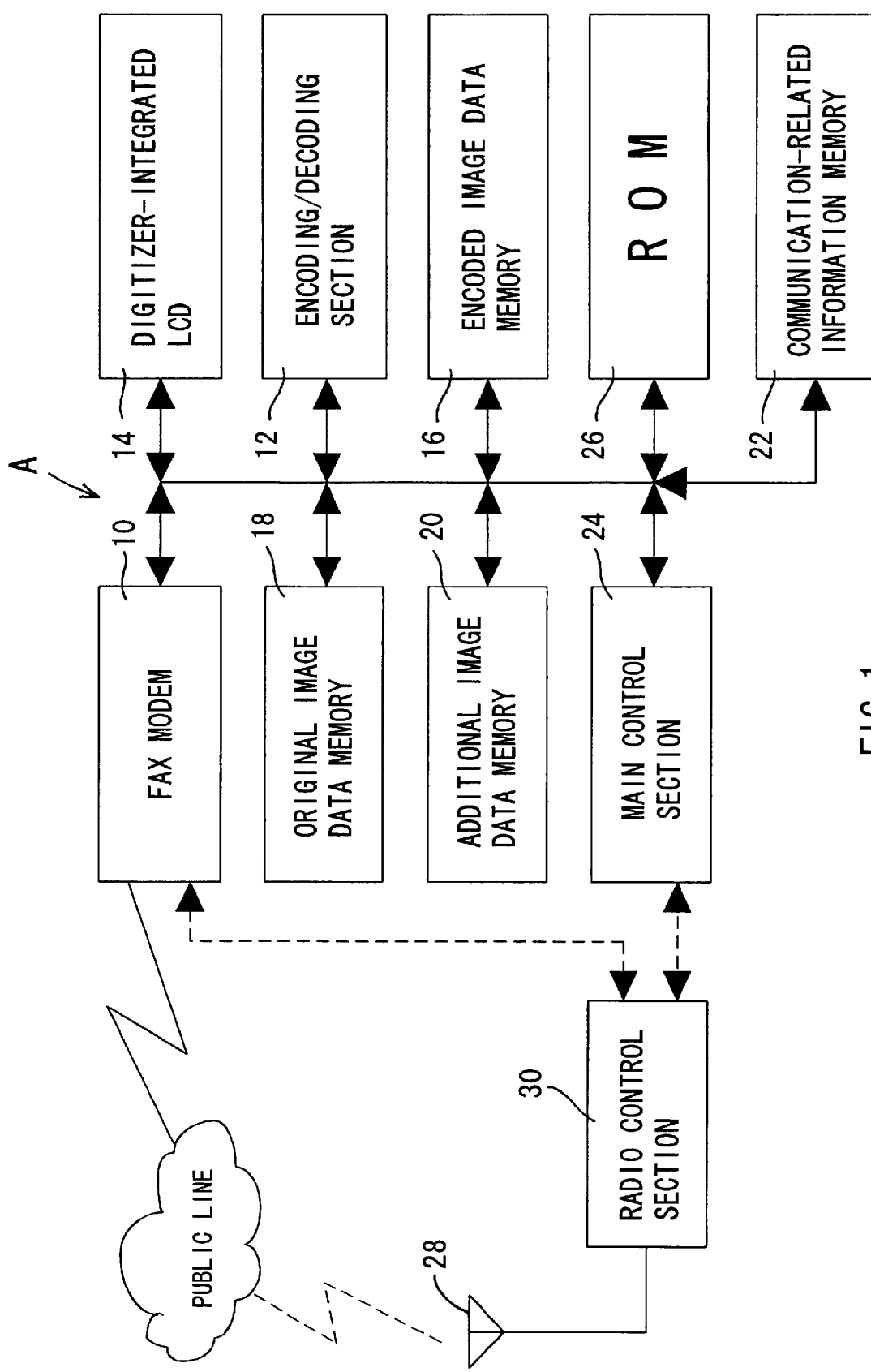
FIG. 1 is a functional block diagram of an image transmission apparatus according to the present invention.

With reference to the accompanying drawings, preferred embodiments of the present invention will be described hereinbelow.

An image transmission apparatus A according to a first embodiment of the present invention comprises a FAX modem 10, an encoding/decoding section 12, a digitizer-integrated LCD 14, encoded image data memory 16, original image data memory 18, additional image data memory 20, communication-related information memory 22, ROM 24, and a main control section 26.

The FAX modem 10 is connected to a public line through a cable, as shown in FIG. 1. The FAX modem 10 acts as the receiving means, the sending means, and the transceiver means. The encoding/decoding section 12 encodes and decodes image data. For example, the encoding/decoding section 12 encodes original image data stored in the original image data memory 18 in a predetermined manner. The thus-encoded original image data are sent to the encoded image data memory 16. Further, the encoding/decoding section 12 decodes the encoded image data stored in the encoded image data memory 16 in a predetermined manner corresponding to the encoding scheme.

The digitizer-integrated LCD 14 is made up of a transparent digitizer stacked on an LCD. The LCD acts as display means, and the digitizer acts as input means. A pressure-sensitive digitizer, a capacitance type digitizer, or an electromagnetic induction type digitizer can be mentioned as the digitizer. The image data stored in the original image data memory 18 is displayed on the LCD. Additions or corrections can be made to the displayed image by entering data from the digitizer.

The encoded image data memory 16 holds encoded image data. More specifically, the encoded image data received by the FAX modem 10 and the image data encoded by the encoding/decoding section 12 are stored in the encoded image data memory 16. The original image data memory 18 holds original image data. Specifically, the original image data memory 18 holds decoded image data of the original image received from the sender and image data of the original image to be sent to a receiver before they are encoded. The original image data memory 18 can hold a plurality of input original image data items. The stored original image data are maintained until the original image data memory 18 receives an erase instruction. The additional image data memory 20 is intended to hold additional image data input from the digitizer-integrated LCD 14. The additional image data memory 20 can hold a plurality of input additional image data items. The stored additional image data are maintained until the additional image data memory 20 receives an erase instruction. The encoded image data memory 16 and the original image data memory 18 act as received data storage means, whereas the encoded image data memory 16 and the additional data memory 20 act as additional data storage means.

The communication-related information memory 22 holds various information items that are not stored in any of the above-described memory sections. For example, the communication-related information memory 22 holds information related to an encoding method to be used in facsimile transmission.

The main control section 24 controls the operations of the above-described elements and is made up of CPU, or the like. The ROM 26 holds programs which the main control section 24 uses to carry out control operations.

Although it is mentioned in the above description that the digitizer-integrated LCD 14 is made up of the transparent digitizer stacked on the LCD, the LCD may be stacked on an electromagnetic induction type digitizer. Further, the digitizer-integrated LCD may be formed into a display-integrated tablet as disclosed in Unexamined Japanese Patent Application No. Hei-5-53726.

Although it is mentioned in the above descriptions that the FAX modem 10 is connected to the public line by a cable, the FAX modem 10 may be connected to the public line by radio communication, as shown in FIG. 1. Where the FAX modem 10 is connected to the public line by radio communication, an image transmission apparatus A is provided with an antenna 28 and a radio control section 30 in addition to the above-described elements. This radio control section 30 establishes radio communication between the image transmission apparatus and a base station, a master machine, or another terminal through the antenna 28. The radio control section 30 modulates data such as communication data or character data according to a modulating scheme which is in compliance with radio communication schemes (e.g., IDMA/TDD scheme, FDMA/FDD scheme, or the like). Conversely, the radio control section 30 demodulates the modulated data according to the above-described modulating scheme. The main control section 24 controls the operation of the radio control section 30.

Figure 2:
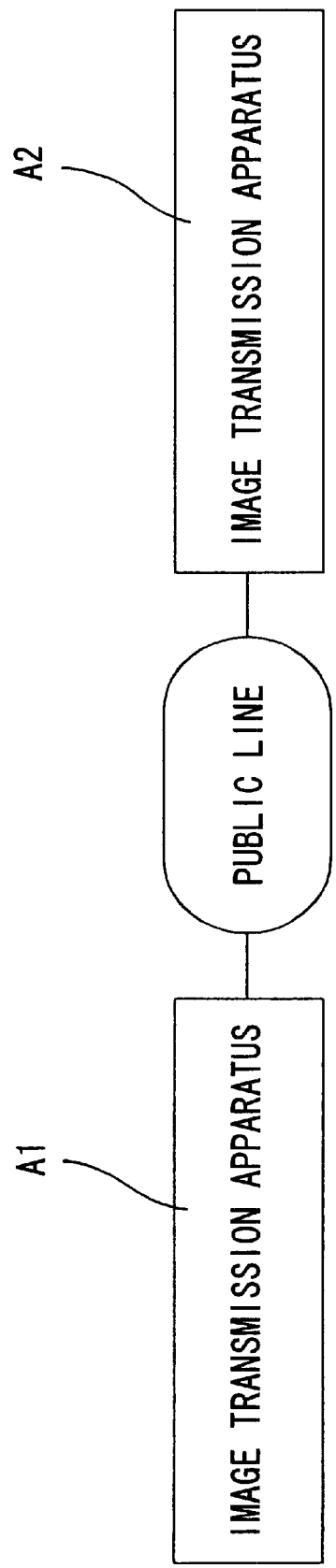
FIG. 2 is an explanatory illustration of the operation of the image transmission apparatus according to one embodiment of the present invention.
Figure 3:
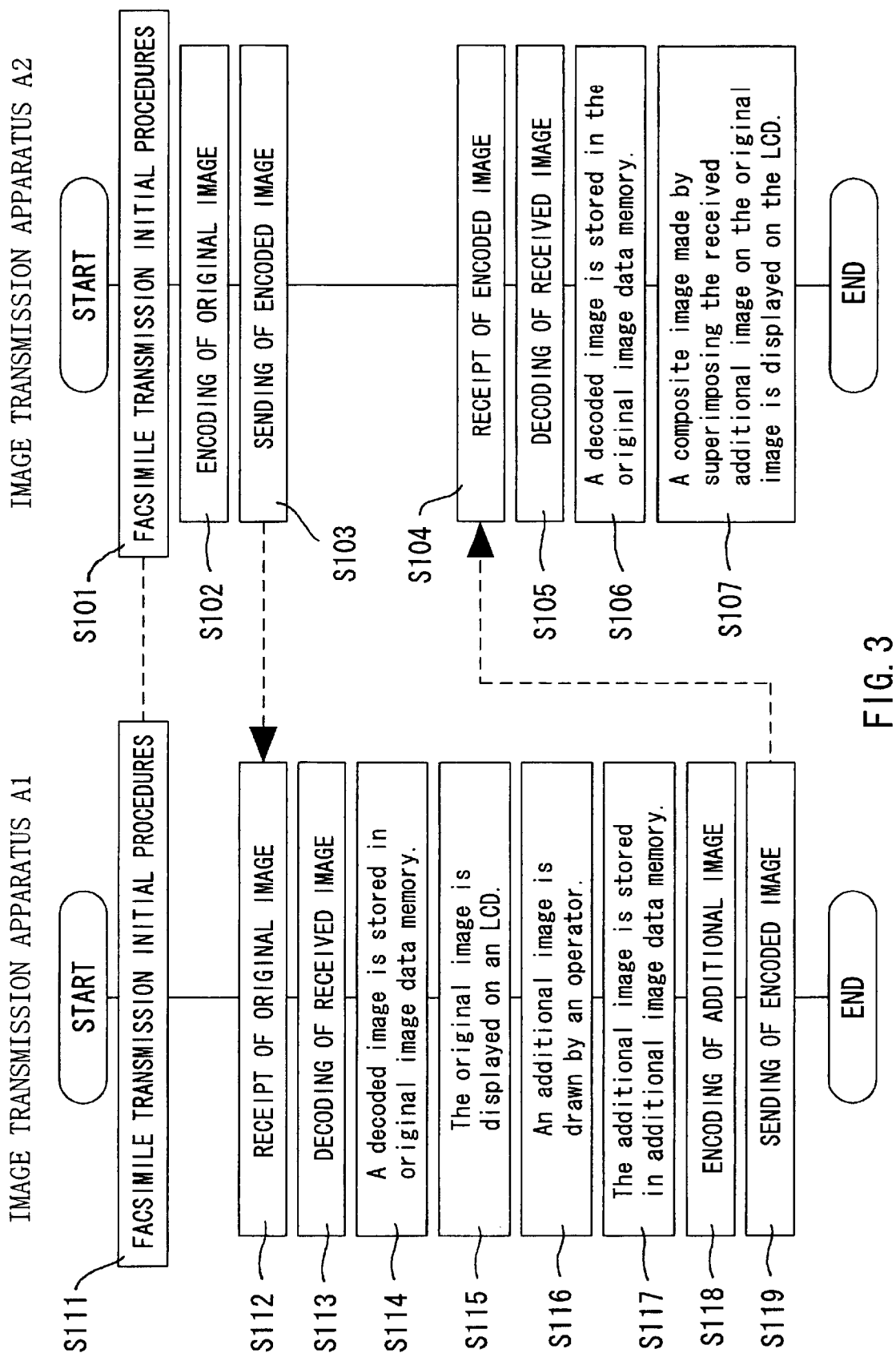
FIG. 3 is a flowchart for explaining the operation of the image transmission apparatus according to one embodiment of the present invention.

The operation of the image transmission apparatus A having the above-described construction will now be described with reference to FIGS. 2 and 3. Assume that the image transmission apparatus A1 shown in FIG. 1 receives original image data, and that an image transmission apparatus which is shown in FIG. 1 and has the same construction as the image transmission apparatus A1 sends original image data, as shown in FIGS. 2 and 3. The image transmission apparatus A1 carries out the entry of additional image data. The image transmission apparatuses A1 and A2 may be connected to the public line by a cable through their FAX modems 10 or by radio communication through their antennas 28 and radio control sections 30.

Figure 5:
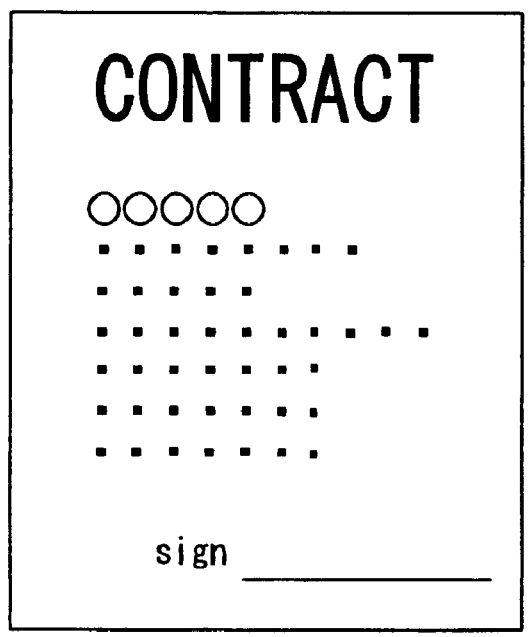
FIG. 5 is an explanatory illustration of original image data when they are displayed.

To begin with, FAX data are supplied from the image transmission apparatus A2 to the FAX modem 10 of the image transmission apparatus A1 over the public line. An encoding method etc. to be used (e.g., a standard encoding method such as MH, MR, or MMR) is determined in accordance with facsimile transmission initial procedures (S101 and S111). The thus-determined encoding method is stored in the communication-related information memory 22. The following descriptions are based on the assumption that the original image data have previously been stored in the original image data memory 18 of the image transmission apparatus A2. An image shown in FIG. 5 can be mentioned as a display image of the original image data. The original image shown in FIG. 5 is a contract.

In the image transmission apparatus A2, the encoding/decoding section 12 encodes the original image data according to the encoding method determined in step S101 (S102). The encoded image data are sequentially transmitted in accordance with the facsimile transmission procedures by the FAX modem 10 (S103). The encoded image data may be temporarily stored in the encoded image data memory 16 at the time of the encoding operation.

In the image transmission apparatus A1, the FAX modem 10 receives the encoded image data in accordance with the facsimile transmission procedures. The thus-received encoded image data are temporarily stored in the encoded image data memory 16 (S112). The encoded image data are sequentially decoded by the encoding/decoding section 12 according to the encoding method determined in step S111 (S113). The thus-decoded image data are stored in the original image data memory 18 (S114).

Figure 6:
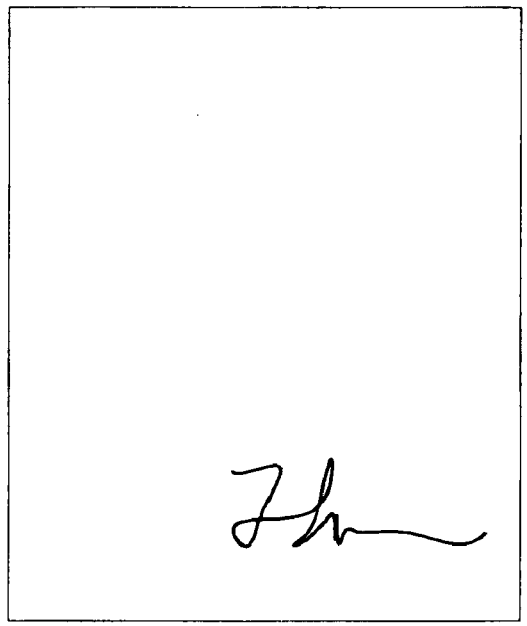
FIG. 6 is an explanatory illustration of additional image data when they are displayed.

The original image data stored in the original image data memory 18 are displayed on the LCD of the digitizer-integrated LCD 14 (S115). In short, where the original image data of the original image shown in FIG. 5 are sent from the image transmission apparatus A2, the original image shown in FIG. 5 is displayed. The operator draws an additional image on the original image displayed on the LCD using digitizer input means such as a pen (S116). Arbitrary images such as letters, symbols, or pictures, can be drawn as the additional image to be entered. FIG. 6 shows one example of the additional images. Specifically, the image shown in FIG. 6 is a signature to be written in a contract that is the original image shown in FIG. 5. If there is a desire to correct the details of the original image, a new matter is entered into the area to be corrected after that area has been corrected by writing, for example, double lines thereon.

Additional image data of the additional image drawn on the original image are stored in the additional image data memory 20 as image data (S117). It is also possible to store the additional image in the additional image data memory 20 not as the image data but as stroke information.

The additional image data stored in the additional image data memory 20 are sequentially encoded by the encoding/decoding section 12 according to the encoding method (e.g., NH, MR, or MMR) determined through the facsimile communication initial procedures in step S111. The thus-encoded additional image data are temporarily stored in the encoded image memory 16 as encoded data (S118). The encoded data stored in the encoded image data memory 16 are transmitted to the image transmission apparatus A2 via the FAX modem 10 (S119). The original image data and the additional image data are retained in the image transmission apparatus A1 until it receives an erase instruction.

In the image transmission apparatus A2, the encoded additional image data received over the public line (S104) are temporarily stored in the encoded image data memory 16. The encoding/decoding section 12 sequentially decodes the additional image data according to the encoding method determined in step S101 (S105). The thus-decoded additional image data are stored in the original image data memory 20 (S106). The additional image data are stored in another memory location of the original image data memory 18 that differs from the memory location in which the transmitted original image data are maintained. In this way, the image transmission apparatus A2 receives the additional image data, and the thus received-additional image data are stored in the original image data memory 18. After that, either the sender or receiver disconnects the communication line according to the facsimile communication procedures. Where the image transmission apparatuses are connected to the public line through a cable, the FAX modem 10 of any one of the image transmission apparatuses disconnects the communication line. In contrast, where the image transmission apparatuses are connected to the public line by radio communication, the radio control section 30 of any one of the image transmission apparatuses disconnects the communication line.

Figure 7:
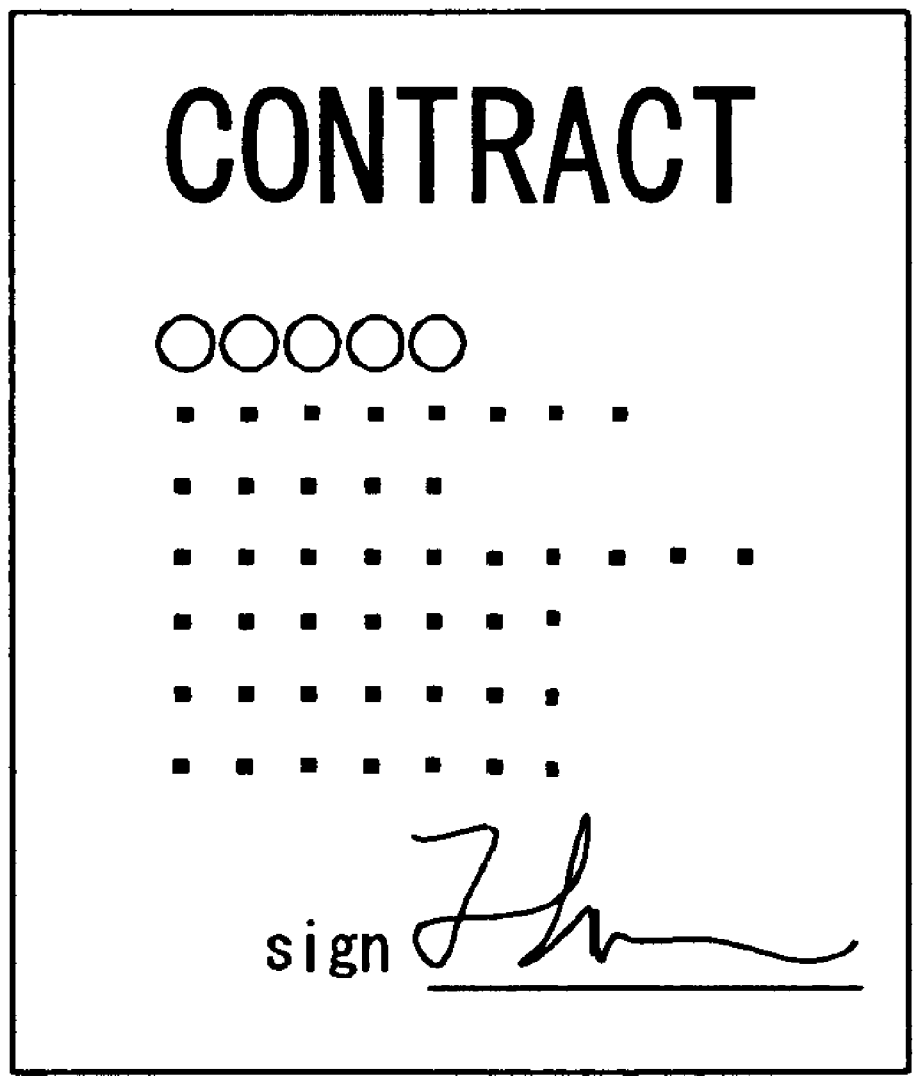
FIG. 7 is an explanatory representation of a composite image consisting of the original image data and the additional image data when it is displayed.

The additional image data are superimposed on the original image data, and a resultant composite image is displayed on the digitizer-integrated LCD 14 (S107). For example, where the composite image is created by use of the original image shown in FIG. 5 and the additional image shown in FIG. 6, the composite image is displayed as illustrated in FIG. 7.

In the image transmission apparatus according to the above-described first embodiment, the sender of the original image data superimposes the received additional image data on the original image data, and the thus-created composite image is displayed. For this reason, picture quality degradation is prevented. Further, only the additional image data are sent from the image transmission apparatus at the receiving end, which makes it possible to reduce communication time and cost. As a result of the storage of additional image data in the image transmission apparatus A1, the history of addition is recorded, which in turn makes it easy to manage images. The storage memory capacity can be relatively reduced. More specifically, when compared with the conventional transmission apparatus that holds both the original image data and the original image data to which additions have been made (i.e., composite image data consisting of the original image data and the additional-image data), the transmission apparatus of the present embodiment holds the received original image data and the additional image data. As a result, the storage memory capacity of the transmission apparatus can be relatively reduced.

Next, an image transmission apparatus according to a second embodiment of the present invention will be described. The image transmission apparatus of the second embodiment has the same construction as the image transmission apparatus shown in FIG. 1. The image transmission apparatus of the second embodiment is different from that of the first embodiment only in the following point. Specifically, the communication line is temporarily disconnected when the original image data have been sent to the receiver. Then, the communication line is connected again when the additional image data have been stored in the additional image data memory 20, and the additional image data are sent.

Figure 4:
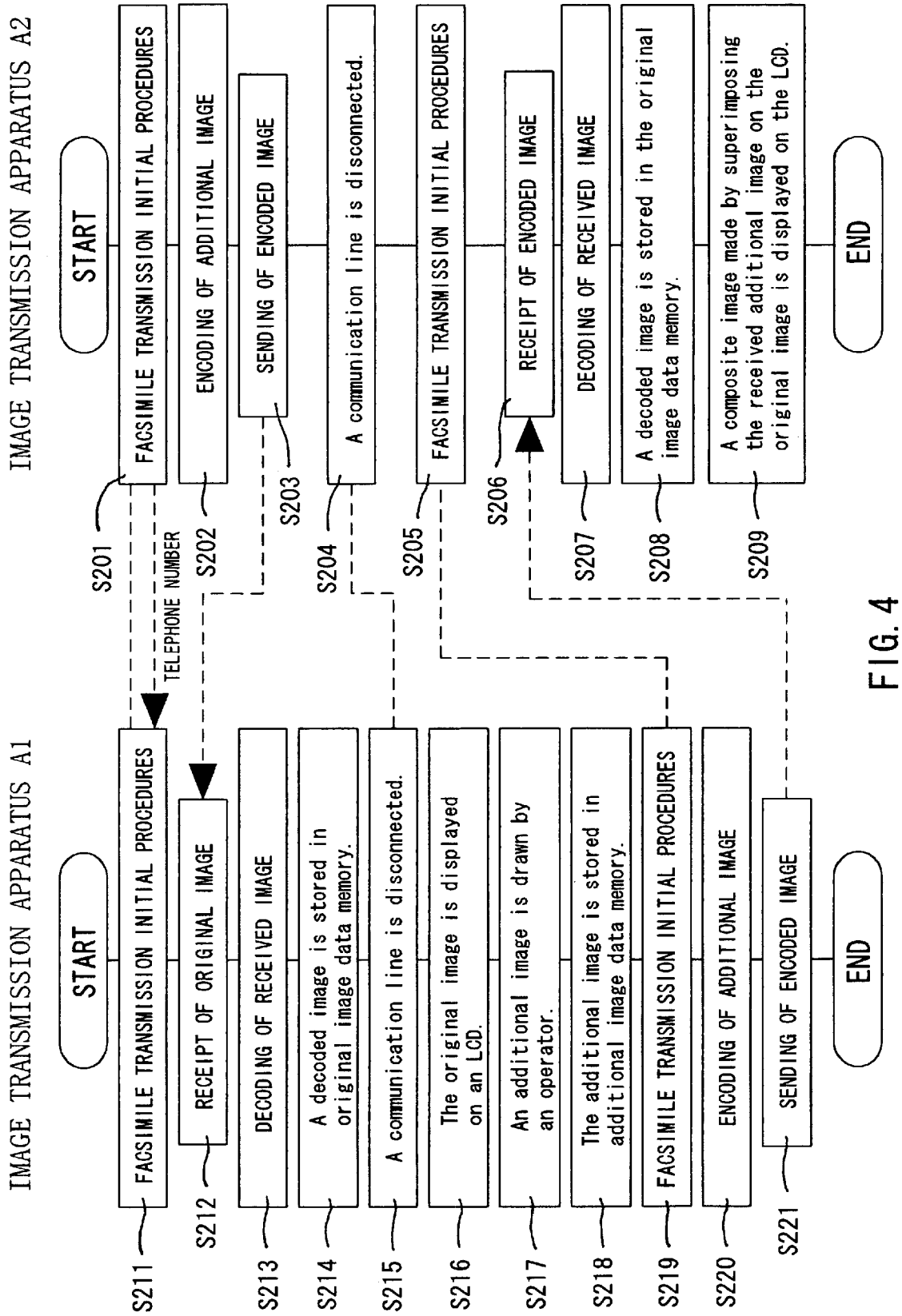
FIG. 4 is a flowchart for explaining the operation of an image transmission apparatus according to another embodiment of the present invention.

With reference to FIGS. 2 and 4, the operation of the image transmission apparatus of the second embodiment will now be described. As in the first embodiment, the image transmission apparatus A1 having the construction shown in FIG. 1 receives original image data, and the image transmission apparatus A2 having the same construction as shown in FIG. 1 sends original image data, as shown in FIGS. 2 and 4. The image transmission apparatuses A1 and A2 may be connected to the public line by a cable through their FAX modems 10 or by radio communication.

To begin with, FAX data are supplied from the image transmission apparatus A2 to the FAX modem 10 of the image transmission apparatus A1 over the public line. An encoding method to be used, or the like, (e.g., a standard encoding method such as MH, MR, or MMR) is determined in accordance with facsimile transmission initial procedures (S201 and S211). The thus-determined encoding method is stored in the communication-related information memory 22. The image transmission apparatus A1 acquires information related to a telephone number of the image transmission apparatus A2 at the other end during the course of the facsimile communication initial procedures. The thus-acquired telephone number of the other party is also stored in the communication-related information memory 22. The following descriptions are based on the assumption that the original image data have previously been stored in the original image data memory 18 of the image transmission apparatus A2. Similar to the first embodiment, the image shown in FIG. 5 can be mentioned as a display image of the original image data.

In the image transmission apparatus A2, the encoding/decoding section 12 encodes the original image data according to the encoding method determined in step S201 (S202). The encoded image data are sequentially transmitted in accordance with the facsimile transmission procedures by the FAX modem 10 (S203). The encoded image data may be temporarily stored in the encoded image data memory 16 at the time of the encoding operation.

In the image transmission apparatus A1, the FAX modem 10 receives the encoded image data in accordance with the facsimile transmission procedures. The thus-received encoded image data are temporarily stored in the encoded image data memory 16 (S212). The encoded image data are sequentially decoded by the encoding/decoding section 12 according to the encoding method determined in step S211 (S213). The thus-decoded image data are stored in the original image data memory 18 (S214).

After the transmission of the image data has been completed in the previously described manner, either the sender or receiver disconnects the communication line in accordance with the facsimile communication procedures (S204, S215). In short, either the image transmission apparatus A1 or A2 disconnects the communication line. More specifically, the FAX modem 10 disconnects the communication line. It is possible to previously determine which of them will disconnect the communication line.

An original image of the original image data stored in the original image data memory 18 is displayed on the LCD of the digitizer-integrated LCD 14 (S216). In other words, if the original image data shown in FIG. 5 are sent, an original image of that original image data is displayed. The operator draws an additional image on the original image displayed on the LCD using digitizer input means such as a pen (S217). FIG. 6 shows one example of the additional images.

Additional image data of the additional image drawn on the original image are stored in the additional image data memory 20 as image data (S218). It is also possible to store the additional image in the additional image data memory 20 not as the image data but as stroke information.

Where the thus-drawn additional image is sent back to the sender of the original image data, the operator enters an instruction for sending the additional image back to the sender, from the digitizer. For example, if the digitizer-integrated LCD 14 has an icon for return purposes, this icon is selected.

As a result, the FAX modem 10 of the image transmission apparatus A1 reads, from the communication-related information memory 22, the telephone number of the other party (i.e., the image transmission apparatus A2) acquired during the course of the facsimile communication initial procedures in step S211. The FAX modem 10 dials the thus-read telephone number and carries out the facsimile communication initial procedures in order to establish facsimile communication with the image transmission apparatus at the other end over the public line. In this event, the FAX modem 10 establishes that connection. Similarly, the image transmission apparatus 2 also carries out the facsimile communication initial procedures (S205).

The additional image data stored in the additional image data memory 20 are sequentially encoded by the encoding/decoding section 12 according to the encoding method (e.g., M, MR, or MMR) determined through the facsimile communication initial procedures in step S219. The thus-encoded additional image data are temporarily stored in the encoded image memory 16 as encoded data (S220). The encoded data stored in the encoded image data memory 16 are transmitted to the image transmission apparatus A2 via the FAX modem 10 (S221). The original image data and the additional-image data are retained in the image transmission apparatus A1 until it receives an erase instruction.

In the image transmission apparatus A2, the encoded additional image data received over the public line (S206) are temporarily stored in the encoded image data memory 16. The encoding/decoding section 12 sequentially decodes the additional image data according to the encoding method determined in step S205 (S207). The thus-decoded additional image data are stored in the original image data memory 20 (S208). The additional image data are stored in another memory location of the original image data memory 18 that differs from the memory location in which the transmitted original image data are maintained. In this way, the image transmission apparatus A2 receives the additional image data, and the thus received-additional image data are stored in the original image data memory 18. After that, either the sender or receiver disconnects the communication line according to the facsimile communication procedures.

Next, the additional image data are superimposed on the original image data, and a resultant composite image is displayed on the digitizer-integrated LCD 14 (S209). For example, where the composite image is created by use of the original image shown in FIG. 5 and the additional image shown in FIG. 6, the composite image is displayed as illustrated in FIG. 7.

In the image transmission apparatus according to the above-described second embodiment, the sender superimposes the received additional image data on the original image data, and the thus-created composite image is displayed. For this reason, picture quality degradation is prevented. Further, only the additional image data are sent from the image transmission apparatus at the receiving end, which enables reduced communication time and cost. As a result of the storage of additional image data in the image transmission apparatus A1, the history of addition is recorded, which in turn makes it easy to manage images. The storage memory capacity can be relatively reduced. The communication line is temporarily disconnected when the original image data are sent to the receiver, and it is connected again when the additional image data are stored in the additional image data memory 20. As a result, the communication time and cost can be reduced. In the first embodiment, the communication line is maintained in a connected state from the time when the communication line is first established between the sender and the receiver up to the time when the additional image data are sent back to the sender, which eventually adds to the communication cost. However, according to the second embodiment, such a problem can be solved.

Next, an image transmission apparatus according to a third embodiment of the present invention will be described. The image transmission apparatus of the third embodiment has substantially the same construction as the image transmission apparatus of the second embodiment. In short, the image transmission apparatus of the third embodiment is constructed as shown in FIG. 1, the communication line is temporarily disconnected when the original image data are sent to the receiver, and it is connected again when the additional image data are stored in the additional image data memory 20. The third embodiment is different from the second embodiment only in the fact that the original image data and the additional image data are sent while they are assigned identification codes.

With reference to FIGS. 2 and 4, the operation of the image transmission apparatus of the third embodiment will now be described. The operation of the image transmission apparatus of the third embodiment is the same as that of the image transmission apparatus of the second embodiment in terms of the flow of processing. As in the first and second embodiments, the image transmission apparatus A1 having the construction shown in FIG. 1 receives original image data, and the image transmission apparatus A2 having the same construction as shown in FIG. 1 sends original image data. The image transmission apparatuses A1 and A2 may be connected to the public line by a cable through their FAX modems 10 or by radio communication.

To begin with, FAX data are supplied from the image transmission apparatus A2 to the FAX modem 10 of the image transmission apparatus A1 over the public line. An encoding method etc. to be used (e.g., a standard encoding method such as MH, MR, or MMR) is determined in accordance with facsimile transmission initial procedures (S201 and S211). The thus-determined encoding method is stored in the communication-related information memory 22. The image transmission apparatus A1 acquires information related to a telephone number of the image transmission apparatus A2 at the other end during the course of the facsimile communication initial procedures. The thus-acquired telephone number of the other party is also stored in the communication-related information memory 22. The following descriptions are based on the assumption that the original image data have previously been stored in the original image data memory 18 of the image transmission apparatus A2, and that the original image data are assigned a unique number (e.g., an identification number) for specifying the image data. Similar to the first embodiment, the image shown in FIG. 5 can be mentioned as a display image of the original image data.

Figure 8:
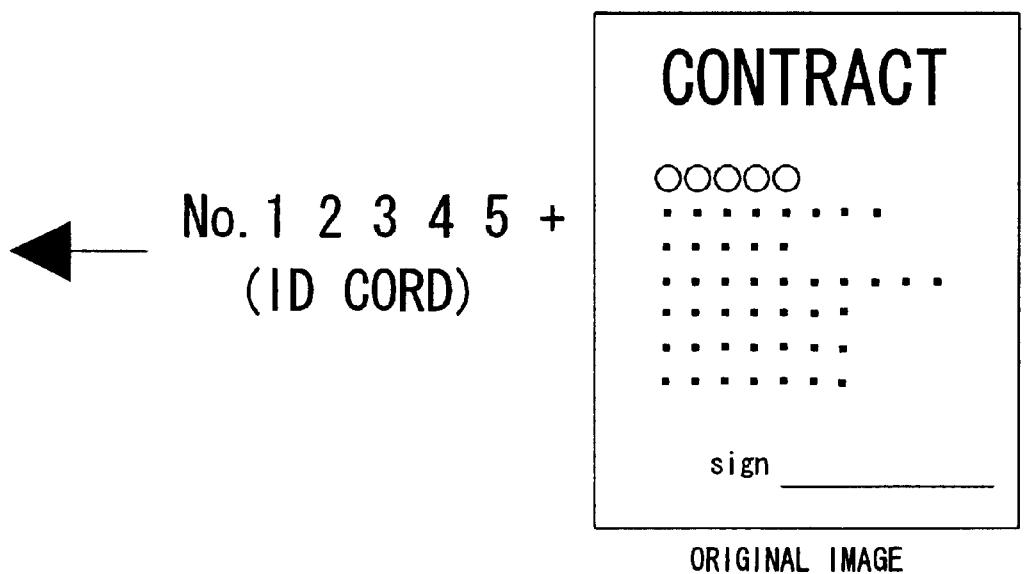
FIG. 8 is a diagrammatic representation of the data sent from the sender of the original image data according to a third embodiment of the present invention.

In the image transmission apparatus A2, the encoding/decoding section 12 encodes the original image data according to the encoding method determined in step S201 (S202). The encoded image data are sequentially transmitted in accordance with the facsimile transmission procedures by the FAX modem 10 (S203). The encoded image data are sent while being assigned the above-described identification code, as shown in FIG. 8. The encoded image data may be temporarily stored in the encoded image data memory 16 at the time of the encoding operation.

In the image transmission apparatus A1, the FAX modem 10 receives the encoded image data in accordance with the facsimile transmission procedures. The thus-received encoded image data are temporarily stored in the encoded image data memory 16 (S212). The encoded image data are stored while being assigned the identification code. The encoded image data are sequentially decoded by the encoding/decoding section 12 according to the encoding method determined in step S211 (S213). The thus-decoded image data are stored in the original image data memory 18 (S214). In short, the thus decoded-image data are stored in the original image data memory 18 while being assigned the identification code.

After the transmission of the image data has been completed in the previously described manner, either the sender or receiver disconnects the communication line in accordance with the facsimile communication procedures (S204, S215). Specifically, either the image transmission apparatus A1 or A2 disconnects the communication line. It is possible to previously determine which of them would disconnect the communication line.

An original image of the original image data stored in the original image data memory 18 is displayed on the LCD of the digitizer-integrated LCD 14 (S216). In other words, if the original image data shown in FIG. 5 are sent, an original image of that original image data is displayed. The operator draws an additional image on the original image displayed on the LCD using digitizer input means such as a pen (S217). FIG. 6 shows one example of the additional images.

Additional image data of the additional image drawn on the original image are stored in the additional image data memory 20 as image data (S218). The additional image data are stored while being assigned the above-described identification code. It is also possible to store the additional image in the additional image data memory 20 not as the image data but as stroke information.

Where the thus-drawn additional image is sent back to the sender of the original image data, the operator enters an instruction for sending the additional image back to the sender, from the digitizer. For example, if the digitizer-integrated LCD 14 has an icon for return purposes, this icon is selected.

As a result, the FAX modem 10 of the image transmission apparatus A1 reads, from the communication-related information memory 22, the telephone number of the other party (i.e., the image transmission apparatus A2) acquired during the course of the facsimile communication initial procedures in step S211. The FAX modem 10 dials the thus-read telephone number and carries out the facsimile communication initial procedures in order to establish facsimile communication with the image transmission apparatus at the other end over the public line (S219). Similarly, the image transmission apparatus 2 also carries out the facsimile communication initial procedures (S205).

Figure 9:
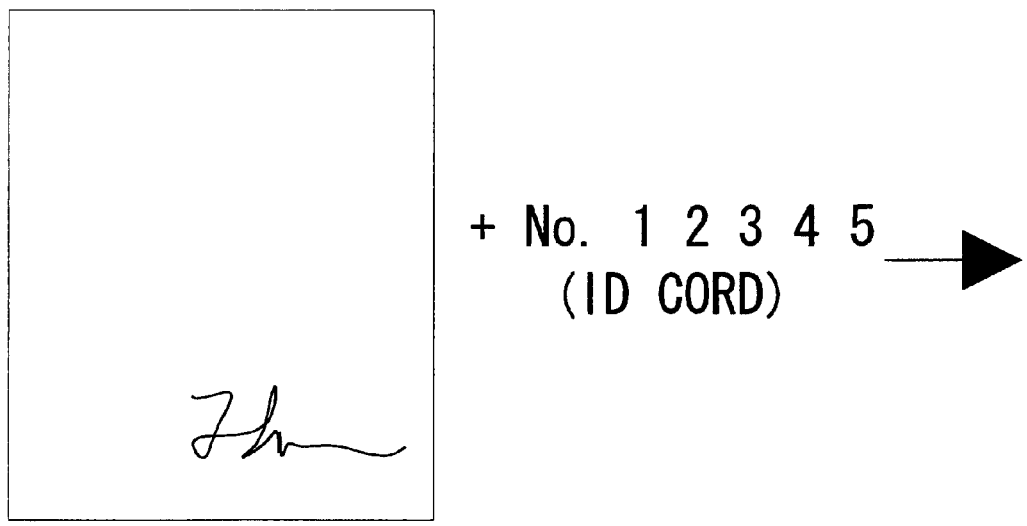
FIG. 9 is a diagrammatic representation of the data sent from a receiver according to the third embodiment of the present invention.

The additional image data with the identification code stored in the additional image data memory 20 are sequentially encoded by the encoding/decoding section 12 according to the encoding method (e.g., MH, MR, or MMR) determined through the facsimile communication initial procedures in step S219. The thus-encoded additional image data are temporarily stored in the encoded image memory 16 as encoded data (S220). The encoded data stored in the encoded image data memory 16 are transmitted to the image transmission apparatus A2 via the FAX modem 10 (S221). The encoded data are also sent while being assigned the above-described identification code, as shown in FIG. 9. The original image data and the additional image data are retained in the image transmission apparatus A1 until it receives an erase instruction.

In the image transmission apparatus A2, the encoded additional image data received over the public line (S206) are temporarily stored in the encoded image data memory 16. The encoding/decoding section 12 sequentially decodes the additional image data according to the encoding method determined in step S205 (S207). The thus-decoded additional image data are stored in the original image data memory 20 (S208). The additional image data are stored in another memory location of the original image data memory 18 that differs from the memory location in which the transmitted original image data are maintained. In this event, the additional image data are stored while being assigned the identification code. As described above, the image transmission apparatus A2 receives the additional image data, and the thus received-additional image data are stored in the original image data memory 18. After that, either the sender or receiver disconnects the communication line according to the facsimile communication procedures.

After the additional image data have been stored in the original image data memory 20, the identification code assigned to those additional image data is read. Then, the original image data corresponding to the identification code are read. The additional image data are superimposed on the original image data, and a resultant composite image is displayed on the LCD of the digitizer-integrated LCD 14 (S209). For example, where the composite image is created by use of the original image shown in FIG. 5 and the additional image shown in FIG. 6, the composite image is displayed as illustrated in FIG. 7.

The image transmission apparatus A1 may be operated in the following manner. In other words, the additional image data are stored in the additional image data memory 20 while being assigned no identification code. When the additional image data are encoded, an identification code is read from the original image data memory 18. The additional image data and the identification code are encoded, and the thus encoded data and code are sent to the image transmission apparatus A2 by the FAX modem 10. To manage the additional image data, the identification code and the additional image data are associated with each other. They are stored in the additional image data memory 20.

According to the image transmission apparatus of the third embodiment, the additional image data are sent to the sender of the original image data, and the composite image is made at the sending end by superimposing the additional image data on the original image data, and the thus-created composite image is displayed, thereby preventing picture quality degradation. The transmission apparatus at the receiving end sends only the additional image, which enables reduced communication time and cost. As a result of the storage of additional image data in the image transmission apparatus A1, the history of addition is recorded, which in turn makes it easy to manage images. The storage. memory capacity can be relatively reduced. The communication line is temporarily disconnected when the original image data are sent to the receiver, and it is connected again when the additional image data are stored in the additional image data memory 20. As a result, the communication time and cost can be reduced. Moreover, the image data are transmitted while being assigned an identification code, which prevents the sender of the original image from being occupied by the current transmission. Further, in the first and second embodiments, the original image data are retained until the additional image data are sent back from the image transmission apparatus A1, and the thus-returned additional image data must be superimposed on the original image data. However, it is only necessary to read the original image data on the basis of the identification code in the image transmission apparatus of the third embodiment. The image transmission apparatus A2 that sent the original image data can be connected to another image transmission apparatus other than the image transmission apparatus A1 after the communication line with the image transmission apparatus A1 has been disconnected (S204).

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention, will, without departing from the spirit and scope of the invention, be apparent to persons skilled in the art.

What is claimed is:

1. An image transmission apparatus operating as a receiver receiving original image data from a sender, said image transmission apparatus comprising:

receiving means for receiving the original image data from the sender;

received image data storage means for holding the original image data received by the receiving means;

display means for displaying an image of the original image data stored in the received image data storage means;

input means for entering additional image data representing an additional image with respect to the image displayed on the display means;

additional image data storage means for holding the additional image data input by the input means; and sending means for sending the additional image data back to the sender, without the original image data, wherein the communication line between the sender and the receiver of the image data is disconnected after the receiving means has received the original image data, and wherein the communication line between the receiver and the sender of the original image data, which was disconnected after the receiving means had received the original image data, is established when the input means has finished entering the additional image.

2. An image transmission apparatus operating as a receiver receiving original image data from a sender, said image transmission apparatus comprising:

receiving means for receiving the original image data from the sender;

received image data storage means for holding the original image data received by the receiving means;

display means for displaying an image of the original image data stored in the received image data storage means;

input means for entering additional image data representing an additional image with respect to the image displayed on the display means;

additional image data storage means for holding the additional image data input by the input means; and sending means for sending the additional image data back to the sender, without the original image data, wherein the communication line between the sender and the receiver of the image data is disconnected after the receiving means has received the original image data, wherein the communication line between the receiver and the sender of the original image data, which was disconnected after the receiving means had received the original image data, is established when the input means has finished entering the additional image, and wherein the receiving means receives the original image data together with an identification code for use in identifying the original image data, and the sending means sends the additional image data together with the identification code.

* * * * *